US010971010B2

(12) United States Patent
Sevi et al.

(10) Patent No.: US 10,971,010 B2
(45) Date of Patent: Apr. 6, 2021

(54) TRACKING SYSTEM, METHOD AND MEDIUM FOR ENHANCING THE USE OF SELECT TRANSIT

(71) Applicant: MASTERCARD INTERNATIONAL INCORPORATED, Purchase, NY (US)

(72) Inventors: Matias Sevi, Aventura, FL (US); Gabriela Daniel, Miami, FL (US); Elena Zaccaria, Key Biscayne, FL (US); Arturo Saldana Guevara, Key Biscayne, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 851 days.

(21) Appl. No.: 15/654,515

(22) Filed: Jul. 19, 2017

(65) Prior Publication Data
US 2018/0137758 A1 May 17, 2018

Related U.S. Application Data

(60) Provisional application No. 62/422,527, filed on Nov. 15, 2016.

(51) Int. Cl.
*G08G 1/123* (2006.01)
*G06Q 10/02* (2012.01)
(Continued)

(52) U.S. Cl.
CPC .......... *G08G 1/123* (2013.01); *G06Q 10/025* (2013.01); *G06Q 50/30* (2013.01)

(58) Field of Classification Search
None
See application file for complete search history.

(56) References Cited

U.S. PATENT DOCUMENTS

2002/0161729 A1* 10/2002 Andrews ............... G07F 7/0866
705/417
2003/0233278 A1* 12/2003 Marshall ........... G06Q 30/0212
705/14.35
(Continued)

OTHER PUBLICATIONS

Disney Internships & Programs Blog "Get Rewarded for Utilizing our Environmentally Friendly Transportation Options in California"; https://disneyprogramsblog.com/environmentally-friendly-transportation-options-in-california/ accessed on the Internet Oct. 7, 2016; 6 pages.

(Continued)

*Primary Examiner* — Tonya Joseph
(74) *Attorney, Agent, or Firm* — Michael Best & Friedrich LLP

(57) ABSTRACT

Systems, methods and mediums to facilitate utilization of select transit entities by tracking and inducing such utilization are disclosed. In embodiments, a first signal indicating that an item utilized a select transit entity is received, wherein a quantity of units to incrementally associate with utilization by the item of the select transit entity is determined. A second signal associated with the item indicating a procurement request is then made to a select provider and reducing at least some units associated with the item and signaling the select provider that the procurement request is to transpire at a reduced rate.

20 Claims, 4 Drawing Sheets

(51) Int. Cl.
*G06Q 50/30* (2012.01)
*G06Q 10/00* (2012.01)

(56) References Cited

U.S. PATENT DOCUMENTS

| | | | | |
|---|---|---|---|---|
| 2008/0128513 | A1* | 6/2008 | Hammad | G06Q 20/16 235/492 |
| 2008/0156873 | A1* | 7/2008 | Wilhelm | G06Q 20/405 235/384 |
| 2008/0179394 | A1* | 7/2008 | Dixon | G06Q 20/382 235/380 |
| 2009/0106101 | A1* | 4/2009 | Green | G06Q 30/0222 705/14.23 |
| 2011/0165866 | A1* | 7/2011 | Dixon | G07B 15/00 455/414.1 |
| 2011/0166936 | A1* | 7/2011 | Dixon | G06Q 30/0261 705/14.58 |
| 2011/0208645 | A1* | 8/2011 | Knauft | G07F 17/0014 705/39 |
| 2012/0234914 | A1* | 9/2012 | Roux | G06O 20/04 235/380 |
| 2014/0019177 | A1* | 1/2014 | Smith | G06Q 10/025 705/6 |
| 2014/0156396 | A1* | 6/2014 | deKozan | G06Q 30/0261 705/14.53 |
| 2014/0278616 | A1* | 9/2014 | Stone | G06O 30/0283 705/6 |

OTHER PUBLICATIONS

Markham, Derek; Treehugger, "New app measures and rewards your transportation CO2 fitness"; https://www.treehugger.com/gadgets/app-measures-rewards-transportation-CO2-fitness.html; Dec. 14, 2014; 4 pages.

Sun Rideshare Rewards Program; http://web.archive.org/web/20161013052000/https://www.pagnet.org/tabid/1122/Default.aspx; Oct. 13, 2016, 6 pages.

* cited by examiner

TRACKING SYSTEM, METHOD AND MEDIUM FOR ENHANCING THE USE OF SELECT TRANSIT

This Application claims the benefit of priority to U.S. Provisional Patent Application Ser. No. 62/422,527, filed Nov. 15, 2016, which is incorporated herein by reference.

SUMMARY

Embodiments discussed herein relate to systems, methods and mediums to facilitate utilization of select transit entities by tracking and inducing such transit utilization. In embodiments, a method to track and facilitate utilization of select transit entities is disclosed, including receiving a first signal indicating that an item utilized a select transit entity, the first signal including an item identifier and a transit entity identifier; determining, based on at least the transit entity identifier and item identifier, a number of units to incrementally associate with the item based on the utilization by the item of the select transit entity, wherein a total number of units associated with the item are dynamically stored in a units database; receiving a second signal associated with the item indicating a procurement request was made to a provider and determining if the procurement request is associated with a select provider; and upon determining that the procurement request is associated with a select provider, then if a deduction criteria is met, automatically deducting at least some units associated with the item in the units database and signaling the select provider that the procurement request is to transpire at a reduced rate.

Also in embodiments, a network-based system to track and facilitate utilization of select transit entities is disclosed, including one or more processors in communication with one or more memory devices, the one or more memory devices containing computer-readable instructions that, when executed by the processor, can operate to: receive a first signal indicating that an item utilized a select transit entity, the first signal including an item identifier and a transit entity identifier; determine, based on at least the transit entity identifier and item identifier, a number of units to incrementally associate with the item based on the utilization by the item of the transit entity, wherein a total number of units associated with the item are dynamically stored in a units database; receive a second signal associated with the item indicating a procurement request was made to a provider and determining if the procurement request is associated with a select provider; and upon determining that the procurement request is associated with a select provider, then if a deduction criteria is met, automatically deduct at least some units associated with the item in the units database and signal the select provider that the procurement request is to transpire at a reduced rate.

DETAILED DESCRIPTION OF THE EMBODIMENTS

Embodiments discussed herein relate to systems, methods and mediums to facilitate utilization of select transit entities by tracking and inducing such utilization.

In embodiments, the utilization of certain transit entities by items such as users or parcels results in the receipt of units such as points or other items by one who has procured the transit. These entities ("select transit entities") can be chosen where they are considered to be environmentally friendly or the like and where it is desired to provide incentives to induce their use. Such entities can include various forms of public transportation, "clean" modes of parcel delivery and ridesharing entities such as cabs, Uber or Citibike®. The units can be accumulated for each transit utilization of an item individually or units (e.g., extra units) can be accumulated if a coordinated effort is undertaken. An example of a coordinated effort includes two users splitting an Uber. Where the item is a parcel, in embodiments, the one procuring the delivery of the parcel will receive the units for choosing a select transit entity to deliver the parcel to its destination.

In embodiments, the units can be exchanged/redeemed in any number of ways. In embodiments, it is contemplated that they would be redeemable at certain select providers. In one example, where a user has accumulated more than a threshold number of units (e.g., by using select transit entities for themselves and/or shipping parcels using select transit entities), then a certain amount will automatically be deducted from their bill when they make a procurement at a select provider. A certain number of units will, as a result, also be deducted from the user's account in the course of that procurement.

Figure 1:
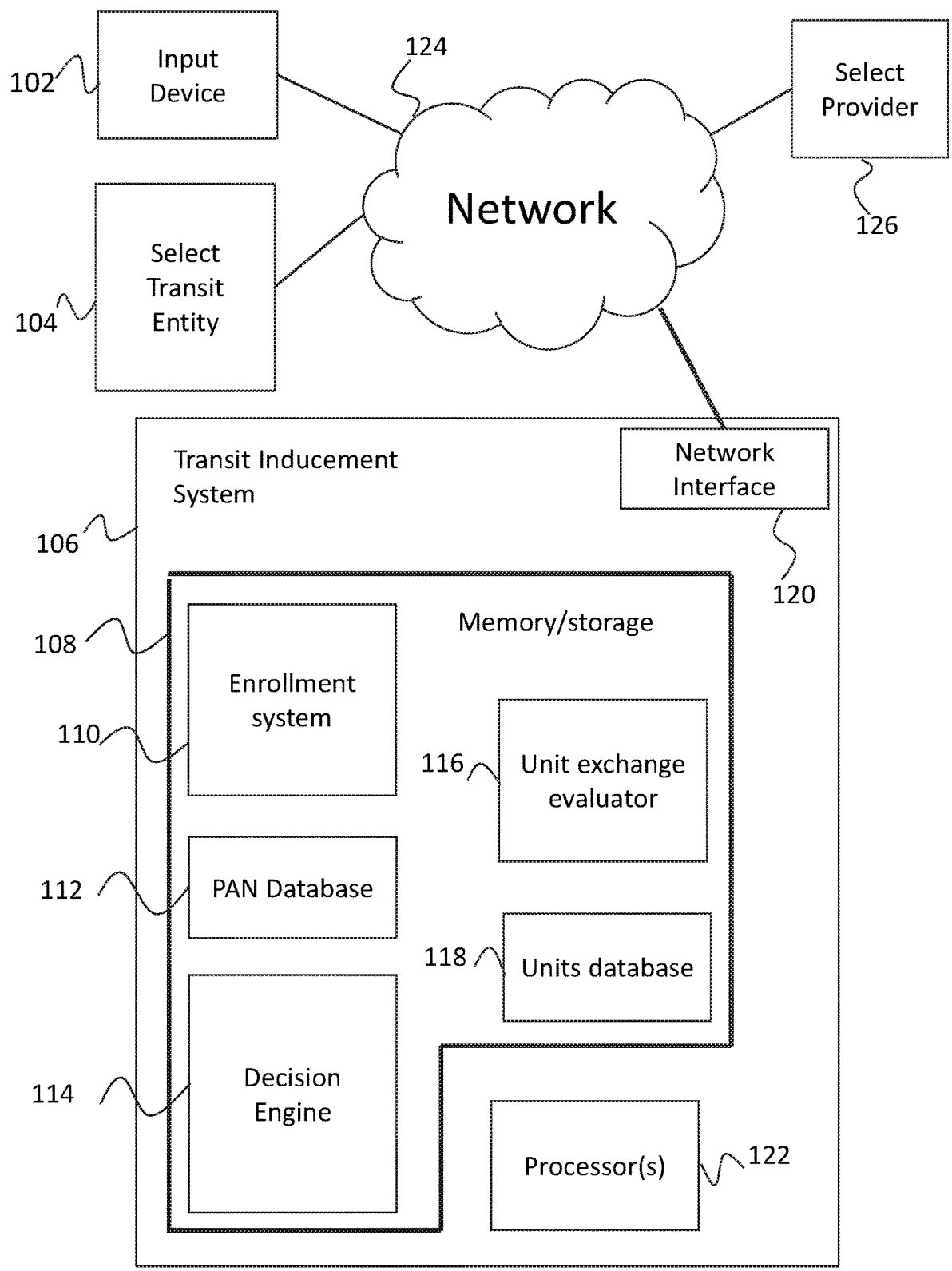
FIG. 1 depicts a block diagram of a transit inducement system in accordance with various embodiments

Embodiments including various components and related aspects for tracking and inducing the use of select transit entities are now described with regard to FIG. 1. An input device 102 is shown that allows a user to enroll in a transit inducement system to permit the user to accumulate units when an item (e.g., the user or a parcel sent by the user) utilizes a select transit entity 104. For example, the input device 102 can be a user's cell phone that, to enroll, accesses an enrollment system 110 at a particular URL via a network 124 and network interface 120. The enrollment system 110 can be part of a transit inducement system 106. It is contemplated that the transit inducement system 106 may be in communication with or part of the issuer of the user's procurement vehicle (e.g., credit, debit or prepaid card) as well as a variety of other institutions.

In embodiments where the enrollment system 110 is associated with the issuer of the user's procurement vehicle, a user can indicate (e.g., by checking a box) that they wish to be enrolled in and take advantage of the transit inducement system 106. This then associates their primary/personal account number (PAN) with the transit inducement system 106. Then, whenever the user utilizes their procurement vehicle to procure transportation on select transit entities for themselves, others or a parcel that they send, they will automatically be accumulating units, as described below.

In embodiments, depending on the manner in which the user enrolls, it may be necessary for the user to enter their PAN at the time of enrollment. This would occur when the enrollment system 110 does not have direct access or permission to obtain the user's PAN directly. In either case, the user's PAN is stored in a PAN database 112 (either as part of an existing procurement vehicle account or as a separate database). In embodiments, the enrollment system 110 also contains information regarding which transit entities are select transit entities that would allow the user to accumulate units when utilized.

Once enrolled, a user can then begin utilizing select transit entities and accumulating units. In particular, a user would use their procurement vehicle to secure transit (e.g., for themselves or a parcel) on select transit entities. A procurement transaction is then recorded in the normal course of using the procurement vehicle that indicates the particular select transit entity 104 that was used and the amount. For example, the record would indicate that a user obtained a ticket on electric commuter train at X location for $25 or that a user rented a Citibike® at Y location for $5. In particular, the issuer of the procurement vehicle, payment card companies and others would have access to this information (which could then be conveyed to transit inducement system 106). In embodiments, it is envisioned that additional information such as the time-of-day that the select transit entity 104 was utilized as well as whether the utilization of the select transit entity 104 was part of a collaborative effort can also be captured, as will be described further below.

It is thus envisioned that the transit inducement system 106 can access procurement vehicle procurement information of an enrolled user (e.g., directly or indirectly and e.g., based on their PAN) and, using a decision engine 114, first determine whether a particular procurement relates to utilization of one of the select transit entities. If a particular procurement is found to relate to utilization of a select transit entity 104, the decision engine 114 also assesses the amount of the procurement and the particular transit entity at issue. It then assigns a certain quantity of units to the procurement. For a given select transit entity 104, in embodiments, a higher dollar amount of procurement translates into more units, under the theory that the user (or parcel) therefore traveled a greater distance and is entitled to a greater quantity of units.

Once the quantity of units has been established for a particular utilization of a select transit entity 104, the units are incremented/stored dynamically in a units database 118. In embodiments, the various units stored within the units database 118 are associated with individual users via some personal identifier such as their PAN.

As indicated above, in embodiments, once a user is enrolled with the transit inducement system 106, they need only use their procurement vehicle in conjunction with select transit entities to begin accumulating units. However, where a user does not have a procurement vehicle (or does not wish to enroll with it) embodiments also contemplate that a user can enroll without a procurement vehicle using or receiving (e.g., from transit inducement system 106) some form of personal identification number not associated with a procurement vehicle. Then, when the user uses, e.g., cash to utilize a select transit entity 104, they also enter their personal identification number in conjunction with their procurement. This can be done, for example, at a kiosk or other procurement station for the select transit entity 104. In this situation, the transit inducement system 106 would functionally operate in many respects substantially the same as described herein for the procurement vehicle embodiment.

As users accumulate units, they can then exchange/redeem them when they make procurements at various select providers such as restaurants, other physical and on-line establishments, and the like. In embodiments, a user can begin exchanging the units once they reach a certain threshold amount, where this redemption occurs automatically. For example, when a user makes a procurement at a select provider 126 using a procurement vehicle, information associated with the request for authorization, including the PAN and amount of the requested procurement, are received by the transit inducement system 106 (in addition to other institutions). Some of this information (e.g., the PAN) is used to identify the particular user by the transit inducement system 106. A unit exchange evaluator 116 then evaluates whether the user is enrolled with the transit inducement system 106 and also evaluates whether the provider at issue is, in fact, a select provider 126 (e.g., whether the select provider 126 has enrolled with the transit inducement system 106 or otherwise has been chosen to be a provider through which units can be redeemed). Thus, it is envisioned that the unit exchange evaluator 116 contains (or otherwise has access to) a list of select providers (e.g., in the form of merchant IDs) or the like, which is envisioned to be updated from time to time.

For enrolled users making procurements at select providers, the unit exchange evaluator 116 determines how many units are available to the user in the units database 118. In embodiments, the units associated with the user in the units database 118 will only be applied once the number of units reach a certain threshold number. The unit exchange evaluator 116 also determines the exchange rate for the units, which may vary with the particular select provider 126 at issue. In embodiments, the use of the transit inducement system 106 in this context occurs automatically.

As an example, a user may receive a $50 check at a restaurant and want to pay for it with their procurement vehicle (e.g., their Mastercard® credit card). During the authorization process, the transit inducement system 106 receives the name of the restaurant and the amount of the check. Where, e.g., the units database 118 shows that the user has over 100 units, the unit exchange evaluator 116 will determine the amount by which the check should be reduced. This exchange rate may be determined on a provider-by-provider basis. Presuming here it's 5 units per dollar and the user has 120 units (i.e., 20 available), then the transit inducement system 106 will notify/signal the select provider 126 via network 124 that the user's check should be reduced by $4 for a total of $46. (This presumes that the authorization for the credit card is not otherwise denied.) In addition, the unit exchange evaluator 116 also decrements the units database 118 by 20 units. Of course, other embodiments are also contemplated, including those where all units could be applied to a procurement as soon as the threshold level is reached as well as embodiments where no threshold amount exists.

As shown in FIG. 1, in embodiments, aspects of the transit inducement system 106 are within a memory/storage 108 residing in one or more computers (not shown) and are executed by processor(s) 122. In general, it should be understood that the aforementioned components are described by way of example, and that embodiments can be implemented in any number of different ways using various components.

In embodiments, processor(s) 122 may represent one or more digital processors. Memory/storage 108 may represent one or both of volatile memory (e.g., RAM, DRAM, and SRAM, and so on) and non-volatile memory (e.g., ROM, EPROM, EEPROM, Flash memory, magnetic storage, optical storage, network storage, or any other computer-readable medium that can be used to store information and can be accessed by a computing device). Memory/storage 108 includes machine readable instructions that are executed by processor(s) 122 to provide the functional aspects of transit inducement system 106 as described herein. Transit inducement system 106 or aspects thereof may be part of an issuer such as CitiBank®, and/or a payment company, such as Mastercard or in communication with one or both of those.

Figure 2:
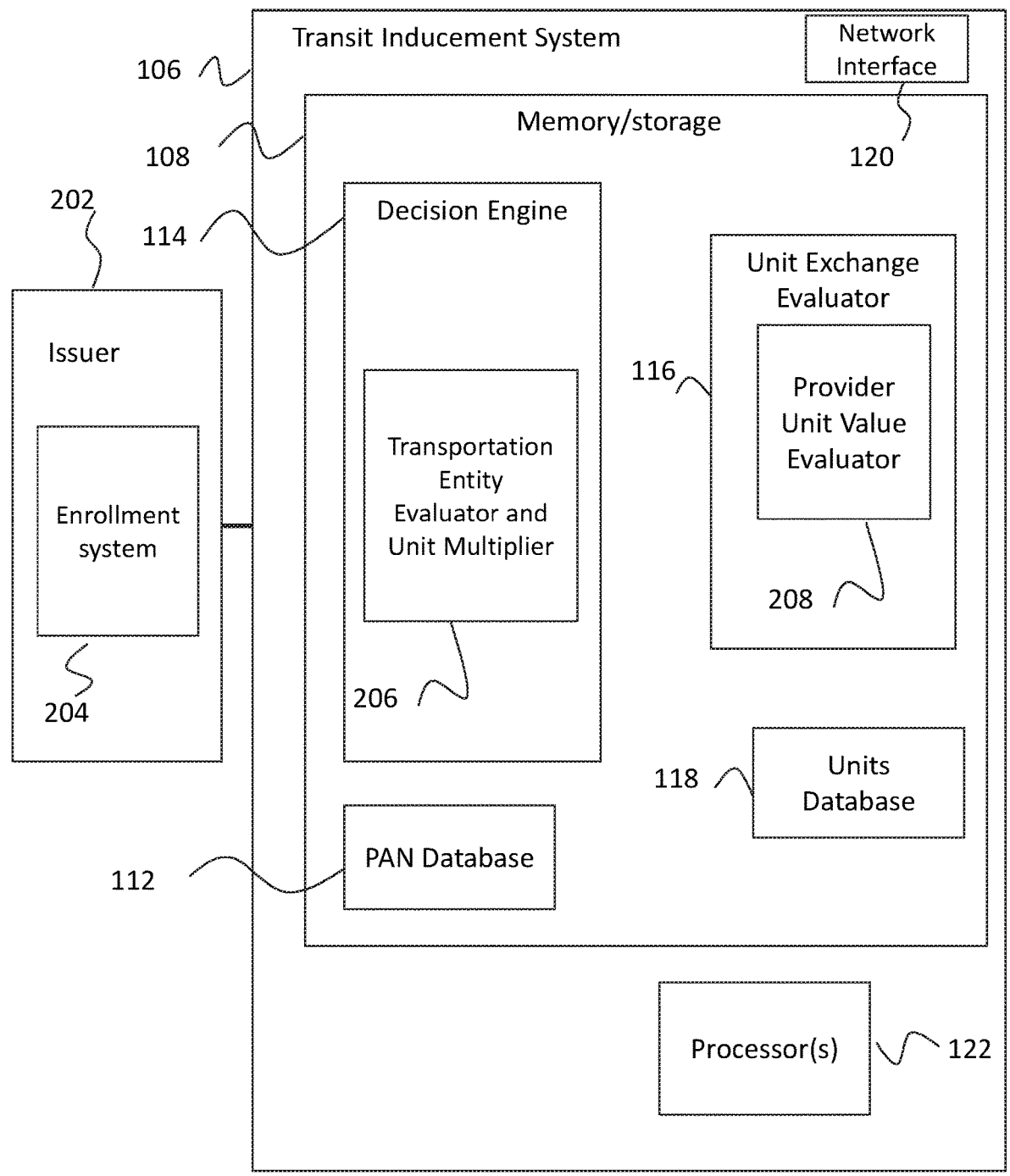
FIG. 2 depicts a block diagram of additional and alternate aspects of a transit inducement system in accordance with various embodiments

Additional details and alternate embodiments are now depicted with regard to FIG. 2. Referring to FIG. 2, an enrollment system 204 is shown as being part of an issuer 202 (e.g., an interface generated from an issuer can be utilized to enroll the item). Since the issuer 202 of the user's procurement vehicle is an institution already having access to certain information utilized by the transit inducement system 106 (e.g., procurement information, including those that may have come from a select transit entity 104) having the enrollment system 204 as part of the issuer 202 may make receipt of such information by the transit inducement system 106 more straightforward. However, in embodiments, the aforementioned interface can also be generated from the computer facilities of a select transit entity 104 or select provider 126.

In embodiments, a transportation entity evaluator and unit multiplier 206 is envisioned as a part of decision engine 114 that evaluates whether a procurement by a user (using a procurement vehicle) is related to a select transit entity 104. For example, it may keep a list of merchant IDs (updated from time to time) corresponding to select transit entities and compares that list to the merchant IDs of transactions made using the user's procurement vehicle. Where such a transaction relating to use of the procurement vehicle at a select transit entity is identified, transportation entity evaluator and unit multiplier 206 also determines the quantity of units to increment the user's account in the units database 118. As mentioned above, factors for determining this include the dollar amount of the procurement as well as the particular type of select transit entity used. For example, X dollars used to rent a CitiBike® may be worth more units than X dollars used to take a gasoline-powered public bus, since the bicycle is considered more environmentally friendly. On the other hand, if it is known that X dollars used on train Y translates to a 100 mile train ride, more units may be allocated to that than X dollars for the bicycle. Thus, in embodiments, information associating a procurement amount with a distance traveled is contemplated.

In addition, in embodiments, transportation entity evaluator and unit multiplier 206 can also receive information such as the time of day that the user utilized the select transit entity 104 and whether a collaborative effort was involved in the use of the select transit entity 104. This additional information is envisioned to possibly affect the units provided to the units database 118. For example, additional units can be provided to a user for utilizing a particular select transit entity 104 during off-peak hours. In addition, additional units can be awarded to users who share an Uber or share a parcel delivery service.

In embodiments, a provider unit value evaluator 208 is a part of the unit exchange evaluator 116 and is used to evaluate the exchange rate of units-to-dollars (or other monetary units) for certain select providers 126. For example, in embodiments, there may be a standard exchange rate for most select providers, though certain select providers may have a custom rate. All this would be addressed via provider unit value evaluator 208.

Figure 3:
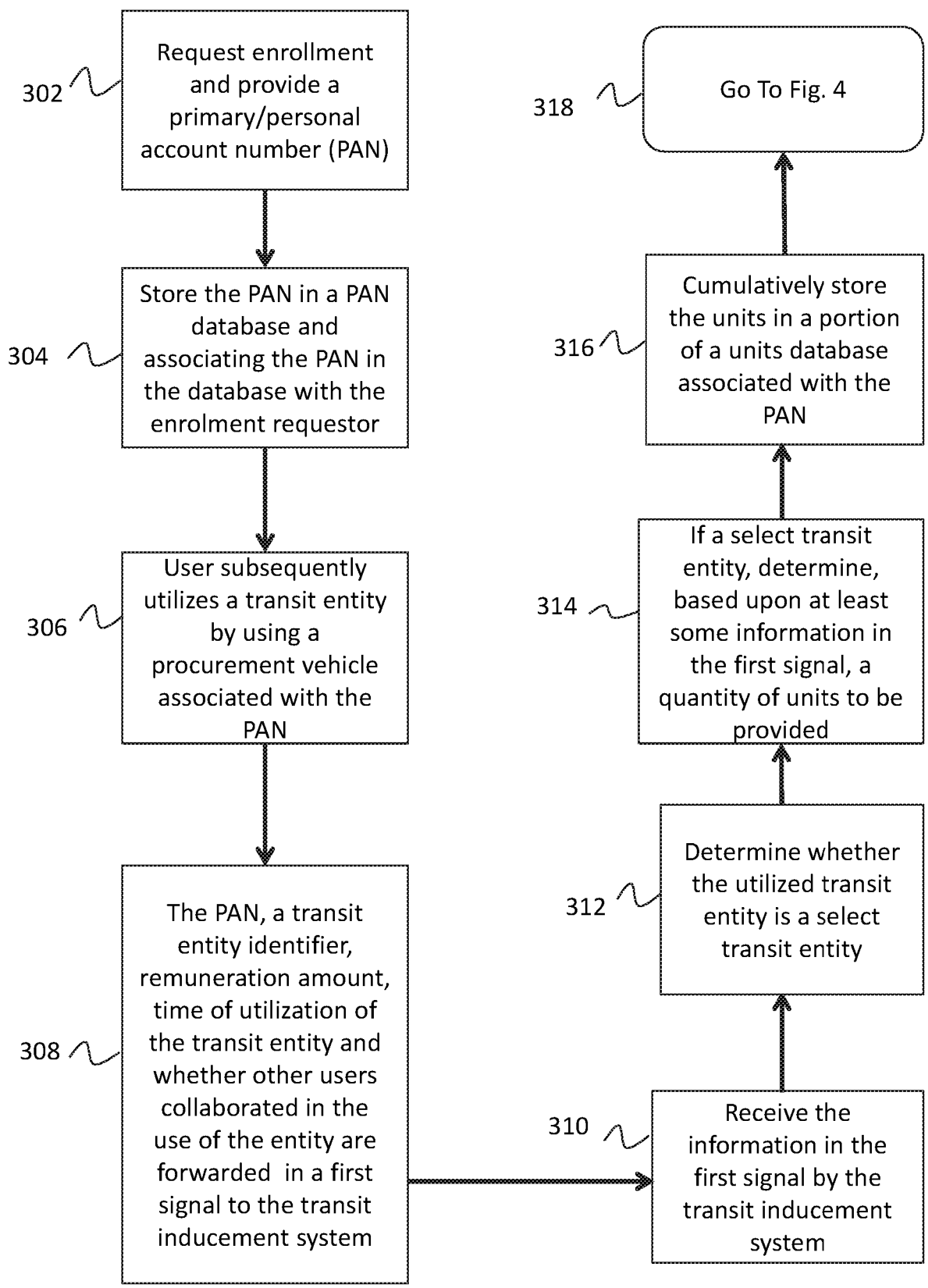
FIGS. 3 and 4 depict a method for promoting the use of select transit entities in accordance with embodiments.
Figure 4:
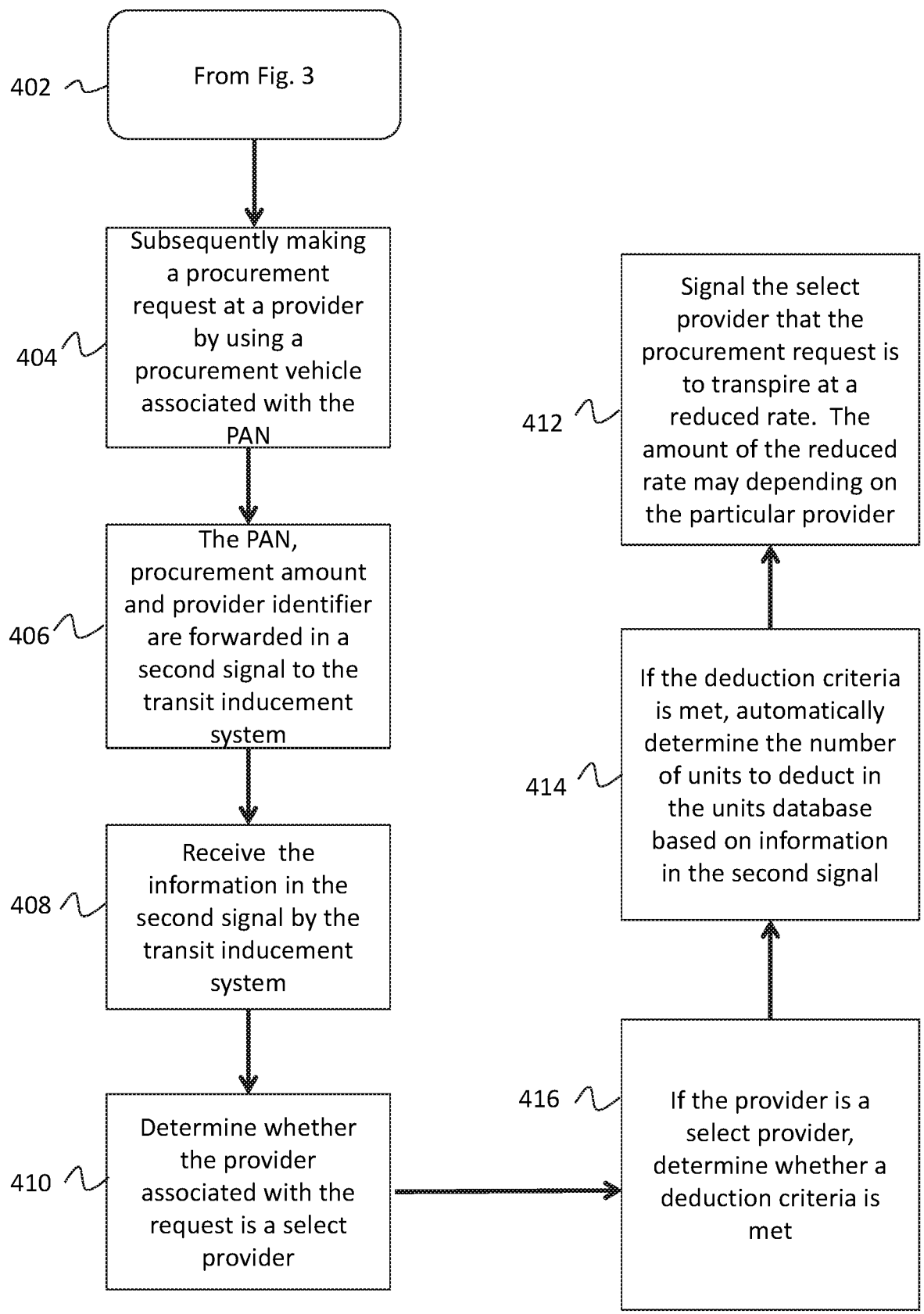

An example method for tracking when select transit entities are utilized and providing inducements for such use is now described with regard to FIGS. 3 and 4. Referring first to FIG. 3, enrollment into the transit inducement system 106 is requested by a user, as indicated by a block 302. In embodiments, this is initiated by the user going to an enrollment page (e.g., by entering a URL or clicking an appropriate link on their cell phone or computer) and entering appropriate information. In embodiments, this could entail entering individual information such as a user's PAN, home address, etc.

The PAN is then stored in a PAN database and associated with the user requesting enrollment, as indicated by a block 304. In embodiments, where the enrollment page is associated with the issuer 202 of the user's payment vehicle and the user has already, e.g., sufficiently verified their authenticity through passwords, etc., the user might only need to check a box on an enrollment page to enroll in the transit inducement system 106. This is because the issuer 202 would already have access to the user's PAN and other user information and, where duly authorized, can transmit any requested information (e.g., all transactions associated with a particular PAN) to transit inducement system 106. In such embodiments, a user's transaction information regarding usage of their payment vehicle can be transmitted from the issuer 202 to the transit inducement system 106 that could include transmitting identifying information about the user but need not include transmitting the PAN itself, particularly where the transit inducement system 106 is external to the issuer 202. However, even in those embodiments, transit inducement system 106 can still potentially have its own PAN database 112 to help identify transactions, units, etc., associated with a particular user. In general, it is envisioned in embodiments that the PAN can be tokenized and used throughout the transit inducement system 106 as a feature for tying the user to their select transit activities.

Once enrolled, to accumulate units, a user can then utilize a transaction entity to transport an item (e.g., themselves or a parcel) using a procurement vehicle (associated with their PAN) to possibly accumulate units if the transit entity is one of the select transit entities, as indicated by a block 306. In particular, when the user makes a procurement, various information is received via a first signal by the transit inducement system 106 (e.g., directly and/or via the issuer 202 of the user's procurement vehicle). This information can include one or more of a PAN (or tokenized form thereof), a transit entity identifier (e.g., a merchant ID associated with the transit entity utilized), a remuneration amount, time of utilization of the transit and whether multiple users collaborated in the utilization of the transit entity, as indicated by blocks 308 and 310. In embodiments, since the PAN in this context is associated with the item utilizing the select transit entities, the PAN (or the like) can also be considered a procurement vehicle identifier.

Once the first signal information is received by the transit inducement system 106, it is determined whether the utilized transit entity is one of the select transit entities (i.e., whether it is one of the transit entities for which the user is eligible to receive units). This is indicated by a block 312. Where this is the case, an appropriate quantity of units to provide to the user is then determined (as discussed above) based on utilization of one of the select transit entities 104 by the item, as indicated by a block 314. These units are then cumulatively stored/incremented in a portion units database 118 associated with the user in view of their PAN (or some other identifier). This is indicated by a block 316.

When a user then makes a procurement request at a provider (e.g., restaurant) using their procurement vehicle, the PAN, procurement amount, and provider identifier (e.g., merchant ID) are forwarded in a second signal (again, directly or indirectly) to the transit inducement system 106, as indicated by blocks 404 and 406. (In embodiments, a select transit entity 104 can also be a select provider 126, allowing a user to, e.g., exchange their units at the same place they accumulated them.) In addition to being used to authorize the procurement in a manner known in the art, the information is received by the transit inducement system 106 where it is determined whether the provider associated with the procurement is a select provider. (In embodiments, units are exchanged only with select providers.) This is indicated by blocks 408 and 410.

If the provider is a select provider, a determination is made whether a deduction criteria is met (i.e., whether the user has enough accumulated units to start exchanging them) as indicated by a block 416. In various embodiments, however, it should be understood that it is not required that such a deduction requirement be implemented, in which case a user can thus begin using their units immediately upon accumulating them.

Where a deduction criteria is implemented, then where the criteria is met, the number of units to deduct (and exchange rate) are automatically determined, as indicated by a block 414. In various embodiments, though, a user has the option of requesting that the units are not exchanged for a particular procurement.

Once the exchange rate is determined, the select provider is signaled/notified that the procurement request is to transpire at a reduced rate. Thus, the user will receive some discount off of their procurement. As indicated previously, the amount of the reduced rate may depend on the arrangement with a particular provider. This is indicted by a block 412.

In embodiments, an amount of carbon emissions saved by the item when utilizing the select transportation entity as compared with other transportation entities can be determined over a requested timeframe, and that amount can be stored and/or displayed.

It should be understood that reference to "a select transit entity 104" is by way of explanation of the various concepts envisioned herein and is not meant to imply that "a select transit entity 104" necessarily refers to the same select transit entity in all cases. The same holds for "a select provider 126."

It should be noted that the matter contained in the above description or shown in the accompanying drawings should be interpreted as illustrative and not in a limiting sense. The following claims are intended to cover all generic and specific features described herein, as well as all statements of the scope of the present method, system, and medium which, as a matter of language, might be said to fall therebetween.

What is claimed is:

1. A method to track, facilitate, and induce utilization of select transit entities that produce less carbon emissions relative to other transit entities, the method comprising:
   receiving, with a transit inducement server, a first signal from an input device, the first signal indicating that an item utilized a select transit entity, the first signal including a procurement vehicle identifier and a transit entity identifier;
   responsive to receiving the first signal, determining, with the transit inducement server, a quantity of units to incrementally associate with the procurement vehicle identifier based on at least the transit entity identifier and the procurement vehicle identifier,
      wherein a total quantity of the units associated with the procurement vehicle identifier are dynamically stored in a units database;
   responsive to determining the quantity of the units, associating, with the transit inducement server, the quantity of the units with the procurement vehicle identifier in the units database;
   receiving, with the transit inducement server, a second signal from the input device, the second signal associated with the procurement vehicle identifier indicating a procurement request was made to a transit provider;
   responsive to receiving the second signal, determining, with the transit inducement server, whether the procurement request is associated with a select transit provider that produces less carbon emissions relative to other transit entities;
   responsive to determining that the procurement request is associated with the select transit provider, determining, with the transit inducement server, whether a deduction criteria is met;
   responsive to determining that the deduction criteria is met, automatically deducting, with the transit inducement server, at least some of the units associated with the procurement vehicle identifier in the units database; and
   responsive to deducting the at least some of the units associated with the procurement vehicle identifier in the units database, transmitting a third signal to the select transit provider indicating that the procurement request is to transpire at a reduced rate.

2. The method of claim 1, wherein the select transit entity and the select transit provider are the same entity.

3. The method of claim 1, further comprising enrolling an existing procurement vehicle associated with the procurement vehicle identifier to accumulate the units.

4. The method of claim 3, wherein an interface generated from one of an issuer, the select transit entity, or the select transit provider is utilized to enroll the existing procurement vehicle.

5. The method of claim 1, wherein the first signal further includes a remuneration amount associated with the select transit entity utilized by item, wherein the quantity of the units incrementally associated with the procurement vehicle identifier is based on at least the transit entity identifier, the procurement vehicle identifier, and the remuneration amount.

6. The method of claim 5, wherein the quantity of the units incrementally associated with the procurement vehicle identifier is based on at least the transit entity identifier, the procurement vehicle identifier, the remuneration amount, one of a time of day that the select transit entity is utilized, and whether additional items associated with the item have collaboratively utilized the select transit entity.

7. The method of claim 1, further comprising:
   determining, with the transit inducement server, an amount of carbon emissions saved by the item when utilizing the select transit entity as compared with the other transit entities; and
   cumulatively storing, with the transit inducement server, the amount of carbon emissions that is determined; and
   transmitting, with the transit inducement server, display information indicating a second amount of carbon emissions saved over a requested timeframe.

8. The method of claim 1, wherein the deduction criteria is met when a number of the units associated with the procurement vehicle identifier in the units database is above a threshold amount.

9. A system to track, facilitate, and induce utilization of select transit entities that produce less carbon emissions relative to other transit entities, the system comprising:
   an input device; and
   a transit inducement server including one or more electronic processors and one or more memory devices, the one or more electronic processors are in communication with the one or more memory devices, the one or more memory devices containing computer-readable instructions that, when executed by the one or more electronic processors, cause the one or more electronic processors to perform a set of operations including:

receiving a first signal from the input device, the first signal indicating that an item utilized a select transit entity, the first signal including a procurement vehicle identifier and a transit entity identifier;

determining a quantity of units to incrementally associate with the procurement vehicle identifier based on at least the transit entity identifier and the procurement vehicle identifier, wherein a total quantity of the units associated with the procurement vehicle identifier are dynamically stored in a units database;

responsive to determining the quantity of the units, associating the quantity of the units with the procurement vehicle identifier in the units database;

receiving a second signal from the input device, the second signal associated with the procurement vehicle identifier indicating a procurement request was made to a transit provider;

responsive to receiving the second signal, determining whether the procurement request is associated with a select transit provider that produces less carbon emissions relative to other transit entities; and responsive to determining that the procurement request is associated with the select transit provider, deducting at least some of the units associated with the procurement vehicle identifier in the units database; and responsive to deducting the at least some of the units associated with the procurement vehicle identifier, transmitting a third signal to the select transit provider that the procurement request is to transpire at a reduced rate.

10. The system of claim 9, wherein the set of operations further includes
determining an approximate number of miles traveled using the select transit entity,
cumulatively storing the approximate number of miles that is determined, and
transmitting display information indicating a second number of miles traveled using the select transit entity over a requested timeframe.

11. The system of claim 9, wherein the select transit entity and the select transit provider are the same entity.

12. The system of claim 9, further comprising enrolling an existing procurement vehicle associated with the procurement vehicle identifier to accumulate the units.

13. The system of claim 12, wherein an interface generated from one of an issuer and a select provider is utilized to enroll the existing procurement vehicle.

14. The system of claim 9, wherein the first signal further includes a remuneration amount associated with the select transit entity utilized by item, wherein the quantity of the units incrementally associated with the procurement vehicle identifier is based on at least the transit entity identifier, the procurement vehicle identifier, and a function of the remuneration amount.

15. The system of claim 14, wherein the quantity of the units incrementally associated with the procurement vehicle identifier is based on at least the transit entity identifier, the procurement vehicle identifier, the remuneration amount, one of a time of day that the select transit entity is utilized, and whether additional items associated with the item have collaboratively utilized the select transit entity.

16. The system of claim 9, further comprising a deduction criteria, wherein the at least some of the units are deducted when the deduction criteria is met,
wherein the deduction criteria is met when a number of the units associated with the procurement vehicle identifier in the units database is above a threshold amount.

17. A non-transitory computer readable medium with computer executable instructions stored thereon that, when executed by an electronic processor of a server, causes the electronic processor to perform a set of operations for tracking, facilitating, and inducing utilization of select transit entities that produce less carbon emissions relative to other transit entities, the set of operations comprising:

controlling a network interface to receive a first signal from an input device, the first signal indicating that an item utilized a select transit entity, the first signal including a procurement vehicle identifier and a transit entity identifier;

determining a quantity of units to incrementally associate with the procurement vehicle identifier based on at least the transit entity identifier and the procurement vehicle identifier, wherein a total quantity of the units associated with the procurement vehicle identifier are dynamically stored in a units database;

responsive to determining the quantity of the units, controlling the units database to associate the quantity of the units with the procurement vehicle identifier;

receiving a second signal from the input device, the second signal associated with the procurement vehicle identifier indicating a procurement request was made to a transit provider;

responsive to receiving the second signal, determining whether the procurement request is associated with a select transit provider that produces less carbon emissions relative to other transit entities; and responsive to determining that the procurement request is associated with the select transit provider, determining whether a deduction criteria is met;

controlling the units database to automatically deduct at least some of the units associated with the procurement vehicle identifier in the units database; and responsive to deducting the at least some of the units associated with the procurement vehicle identifier in the units database, transmitting a third signal to the select transit provider that the procurement request is to transpire at a reduced rate.

18. The non-transitory computer readable medium of claim 17, further comprising enrolling an existing procurement vehicle associated with the procurement vehicle identifier to accumulate units.

19. The non-transitory computer readable medium of claim 17, wherein the first signal further includes a remuneration amount associated with the select transit entity utilized by item, wherein the quantity of the units incrementally associated with the item is based on at least the transit entity identifier, the procurement vehicle identifier, and the remuneration amount.

20. The non-transitory computer readable medium of claim 19, wherein the quantity of the units incrementally associated with the item is based on at least the transit entity identifier, the procurement vehicle identifier, the remuneration amount, one of a time of day that the select transit entity is utilized, and whether additional items associated with the item have collaboratively utilized the select transit entity.

* * * * *